United States Patent
Gula et al.

(10) Patent No.: US 10,185,951 B2
(45) Date of Patent: Jan. 22, 2019

(54) MERCHANT CARD EXCHANGE FACILITATOR SYSTEM

(71) Applicant: CardSwapper, LLC, Mercer Island, WA (US)

(72) Inventors: Bryan Gula, Seattle, WA (US); Samuel Makali'i Seto Tanner, Olympia, WA (US)

(73) Assignee: CardSwapper, LLC, Mercer Island, WA (US)

( * ) Notice: Subject to any disclaimer, the term of this patent is extended or adjusted under 35 U.S.C. 154(b) by 572 days.

(21) Appl. No.: 14/821,314

(22) Filed: Aug. 7, 2015

(65) Prior Publication Data

US 2016/0063483 A1    Mar. 3, 2016

Related U.S. Application Data

(60) Provisional application No. 62/044,652, filed on Sep. 2, 2014.

(51) Int. Cl.
  G06Q 20/34    (2012.01)
  G06Q 30/06    (2012.01)
(52) U.S. Cl.
  CPC .......... G06Q 20/34 (2013.01); G06Q 30/06 (2013.01)
(58) Field of Classification Search
  None
  See application file for complete search history.

(56) References Cited

U.S. PATENT DOCUMENTS

| | | | |
|---|---|---|---|
| 8,438,073 B2 | 5/2013 | White | |
| 9,704,163 B2* | 7/2017 | Kasmai | G06Q 20/105 |
| 2011/0307378 A1* | 12/2011 | Doran | G06Q 20/10 |
| | | | 705/41 |
| 2012/0234911 A1 | 9/2012 | Yankovich et al. | |
| 2013/0073459 A1 | 3/2013 | Zacarias et al. | |
| 2014/0122324 A1* | 5/2014 | Spier | G06Q 20/10 |
| | | | 705/39 |
| 2014/0156523 A1* | 6/2014 | Dinkin | G06Q 10/10 |
| | | | 705/41 |
| 2015/0302395 A1* | 10/2015 | Rinaldi | G06Q 20/28 |
| | | | 705/41 |

OTHER PUBLICATIONS

Cardpool, Inc., "How it Works | Cardpool," retrieved Aug. 6, 2015 from http://www.cardpool.com/support/how-it-works, 1 page.
Gift Card Swapping, LLC, "GiftCard Swapping.com," retrieved May 28, 2015 from http://www.giftcardswapping.com/, 3 pages.
Swappable, "About the App," retrieved May 28, 2015 from http://swappableapp.com/about.html, 1 page.

* cited by examiner

*Primary Examiner* — Robert R Niquette
(74) *Attorney, Agent, or Firm* — Seed IP Law Group LLP

(57) ABSTRACT

Systems and methods are provided for managing authorization and device configuration to facilitate the usage, sale and transfer of merchant cards in various manners that enable one or more authorized users to store information representative of one or more of such merchant cards in a user-specific mobile electronic wallet.

20 Claims, 5 Drawing Sheets

MERCHANT CARD EXCHANGE FACILITATOR SYSTEM

BACKGROUND

Common financial instruments include credit cards, debit cards, and merchant cards. A merchant card is a financial instrument in which funds are associated with the card and not necessarily associated with any individual. Gift and pre-paid cards are common merchant cards. Gift cards allow a recipient to select goods or services the recipient wishes from the products/services sold by the issuing merchant upon redemption of the gift card. Although merchant cards typically resemble credit cards in size and composition, increasingly merchant cards are virtualized for electronic delivery and redemption across digital networks, such as the Internet. Furthermore, while merchant cards are often identified by a specific number or code, merchant cards are typically not associated with an individual name or account. Thus, merchant cards are typically transferable. In order to support merchant cards, an issuing merchant or other issuing entity maintains (directly or indirectly) an online electronic system for authorization and accounting of merchant cards issued by the issuing merchant. Some merchant cards can be "reloaded" with additional monetary value. Thus, the funds associated with such merchant cards can be depleted and replenished multiple times.

Another disadvantage of merchant cards is that merchant cards can only be used to make purchases from one or more merchants specifically designated by the issuer of the merchant cards, who is often either the designated merchant or contractually associated with the designated merchant. For this reason, a recipient of a merchant card issued by or for merchant A is unable to utilize the merchant card to acquire products or services from merchant B, despite a desire to purchase goods from merchant B or a lack of desire to purchase goods from merchant A.

BRIEF SUMMARY

In an embodiment, an electronic mobile wallet is maintained by a Merchant Card Exchange Facilitator (MCEF) service for each of multiple users. A mobile wallet for a particular user may include information about one or more merchant cards. A merchant card identified in a user's mobile wallet may be acquired by a user and then added to the user's mobile wallet by providing identification information specific to the particular merchant card to an embodiment of a Merchant Card Exchange Facilitator (MCEF) system.

A particular merchant card identified in a user's mobile wallet may be a merchant card that the user acquired from another user via the MCEF system. For example, in certain embodiments, a user may exchange one merchant card redeemable by a first merchant for a distinct other merchant card redeemable by a second merchant, or may purchase a particular merchant card from the MCEF system directly.

In certain embodiments, a user may access their mobile wallet from a variety of client devices (e.g., a mobile device such as a cellular phone, smart phone, laptop, mobile gaming device, etc., or another client device such as a desktop computing system, smart TV, set-top box, etc.) using a web browser or a dedicated application. A user's electronic mobile wallet may, in certain embodiments, eliminate a need for the user to carry plastic cards or other physical media that store account information associated with merchant cards associated with the user's mobile wallet.

DETAILED DESCRIPTION

Figure 1:
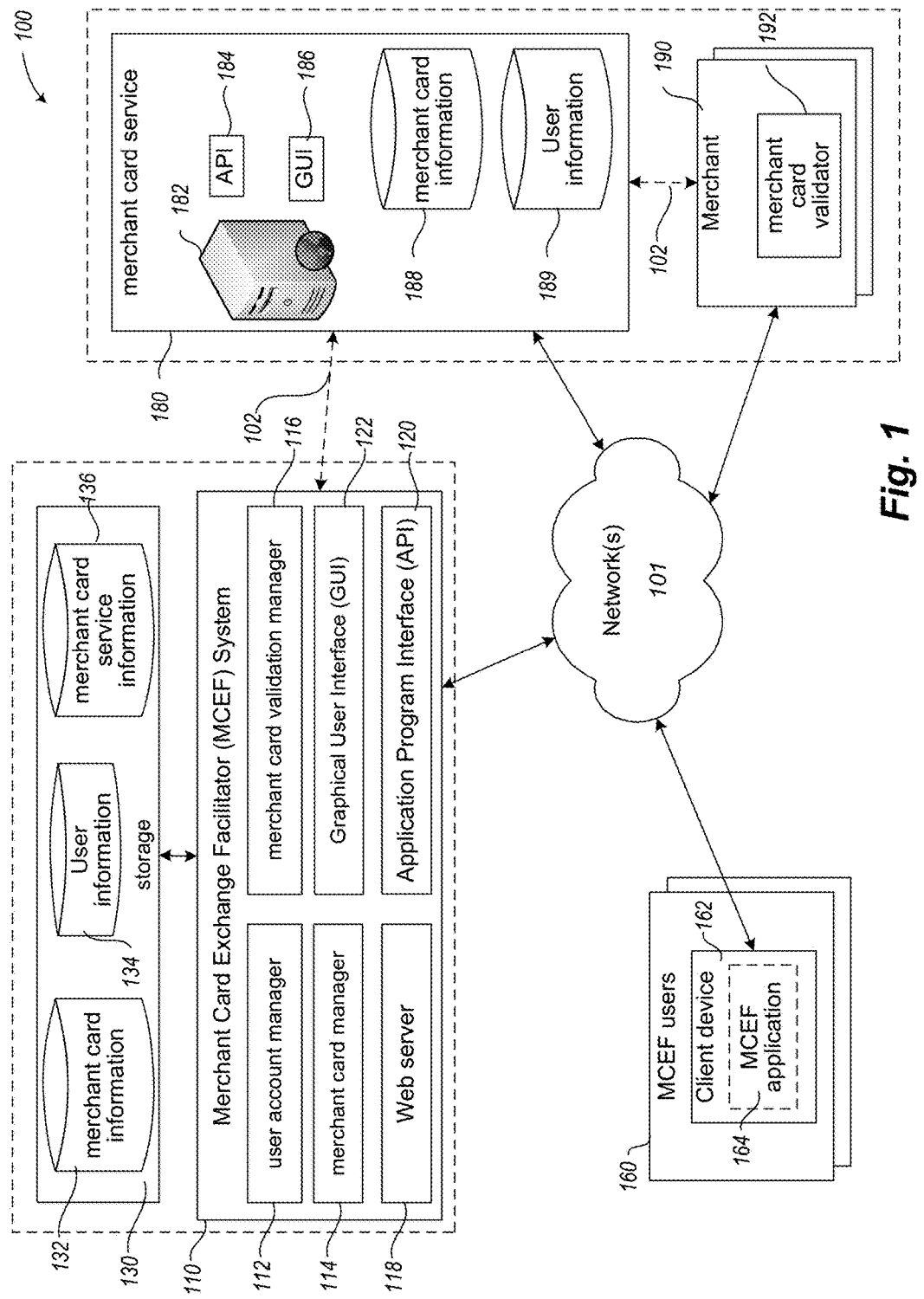
FIG. 1 is a schematic diagram of a networked environment that includes a Merchant Card Exchange Facilitator ("MCEF") System as well as various computing systems associated with one or more merchant card services, with one or more merchant locations, and with one or more users of the MCEF System.

The present disclosure is directed to providing a Merchant Card Exchange Facilitator Web site, management server, and/or mobile presence that enables individual users to provide and/or receive information regarding and/or representative of particular merchant cards in order to use, sell, or transfer such merchant cards in exchange for a monetary payment or for merchant cards associated with other merchants. Additional information regarding such devices may be included in U.S. Patent Application No. 62/044,652, filed on Sep. 2, 2014, and hereby incorporated by reference in its entirety. In certain embodiments, a Merchant Card Exchange Facilitator (MCEF) system provides a customer-to-customer mobile market for the exchange and/or sale of merchant cards that emphasizes ease of use, low-latency, and security for users of the MCEF system.

As used herein, the term "merchant card" may include any physical or electronic instrument or document indicating or representing authorization to use an amount of currency to acquire goods and/or services from one or more identified merchants. In at least some embodiments, such merchant cards may be qualified by one or more limitations. Non-limiting examples of such merchant cards may include gift cards, prepaid debit cards, gift certificates, etc. Typically, a merchant card may be issued by a merchant card service that is associated with or operated by a particular merchant, for which the issued merchant card is intended to be used. A particular merchant card may be associated with various characteristics, such as a specific merchant or merchant location (such as if use of the merchant card is limited to a subset of merchant locations associated with the specified merchant, which may be typical of various franchise operations), as well as a card balance indicating an amount of currency associated with the particular merchant card that may be used to purchase or otherwise acquire products and/or services offered by the specified merchant.

In addition, a merchant card may be associated with one or more identifiers, such as may be specific to the merchant card and may be authenticated by the issuing merchant card service or the merchant for which the issued merchant card is intended to be used. For example, such identifiers may include textual identifiers (e.g., a numeric or alphanumeric sequence or other textual array) or graphical identifiers (e.g., a unidimensional, two-dimensional or three-dimensional barcode).

Also as used herein, the term "user" may refer to any human or other entity interacting with the MCEF system, with a merchant card service, or with a merchant. A particular user may, at various times and in various circumstances, operate as either a "card-acquiring user" or "card-providing user," and may additionally operate as both a "card-acquiring user" and "card-providing user" simultaneously in certain circumstances. The term "selecting," when used herein in relation to one or more elements of a graphical user interface or other electronic display, may include various user actions taken with respect to various input control devices depending on the client computing device used to interact with the display, such as one or more clicks using a mouse or other pointing device, one or more tapping interactions using a touch screen of a client device, etc.

FIG. 1 is a schematic diagram of a networked environment 100 that includes a Merchant Card Exchange Facilitator ("MCEF") System 110, users 160 of the MCEF system, and various computing systems associated with one or more merchant card service providers 180 and with one or more merchant locations 190.

In the depicted embodiment, the MCEF system 110 includes a user account manager 112, a merchant card manager 114, and a merchant card validation manager 116. In addition, the MCEF system includes a Web server 118, an Application Program Interface ("API") 120, and a Graphical User Interface ("GUI") 122. The MCEF system is communicatively coupled (locally or remotely) to storage facility 130, which includes merchant card information database 132, user information database 134 and merchant card service information database 136. In certain embodiments, the storage facility 130 may be incorporated within or otherwise directly operated by the MCEF system; in other embodiments, some or all of the functionality provided by the storage facility may be provided by one or more third-party network-accessible storage service providers.

The illustrated example of FIG. 1 includes a number of user computing systems 160 that are each interacting at various times with an embodiment of a MCEF system 110 via one or more intervening networks 101.

The interactions of users 160 and other entities with the MCEF system 110 may occur in various ways, such as in an interactive manner via a graphical user interface 122 that is provided by the MCEF system to those users and/or other entities via at least some Web pages of a MCEF system Web site provided by Web server 118. Information provided by the Web site may also be provided in a programmatic manner by one or more client software applications via the Application Program Interface ("API") 120 provided by the MCEF system that allows computing systems and/or programs to invoke such functionality programmatically, such as using Web services or other network communication protocols. In the illustrated embodiment, various interactions between the MCEF system and client computing devices 162, respectively associated with users 160, may be performed using a web browser (not shown) or application 164, which may be executing on the associated client device. As used herein, a client computing device associated with a user may be fixed or mobile, and may include instances of various computing devices such as, without limitation, desktop or other computers (e.g., tablets, slates, etc.), database servers, network storage devices and other network devices, smart phones and other cell phones, consumer electronics, digital music player devices, handheld gaming devices, PDAs, pagers, electronic organizers, Internet appliances, television-based systems (e.g., using set-top boxes and/or personal/digital video recorders), and various other consumer products that include appropriate communication capabilities.

The MCEF system may exchange various electronic communications with client computing devices associated with the users 160 in order to provide various functionality to such users. For example, a card-providing user may typically interact with the MCEF system in order to register a new merchant card (not shown) with the MCEF service; in order to provide information regarding a merchant card that the user wishes to sell or swap via the MCEF system, either after previously registering the merchant card with the MCEF system or otherwise; in order to receive payment (or an indication of payment) for a merchant card provided by the user that has been sold or otherwise transferred to another user; to request or search for a merchant card that satisfies particular criteria specified by the user; in order to provide fees to the MCEF system (such as monetary usage fees or other charges associated with acquiring a merchant card) in exchange for obtaining a requested merchant card; in order to receive information representative of a merchant card provided by the MCEF system, such as via electronic communications indicative of one or more identifiers associated with the provided merchant card; etc. In addition, the user may interact with the MCEF system to provide various information regarding the user, such as contact information, financial information (such as to facilitate payments provided to or received from the MCEF system), user preference information, location information, etc. As indicated elsewhere herein, a user 160 may interact with the MCEF system via a client computing device 162 associated with the user, such as via API 120 and a MCEF application 164 executing on the client computing device, or via a web browser (not shown) executing on the client computing device and a GUI 122 provided by Web server 118.

In various embodiments, the client computing device 162 may include a visual capture capability, such as to capture and provide to the MCEF service a photograph or other graphical depiction of one or more identifiers associated with the merchant card being provided by the user to the MCEF system; and/or a display capability, such as to display to the user, to a merchant, or to another party a visual representation of one or more identifiers associated with a merchant card. For example, in certain embodiments the MCEF system may provide the client computing device 162 with a photograph or other graphical depiction of such identifiers received from another user that previously provided the merchant card to the MCEF system. In other embodiments, the MCEF system may provide the client computing device with information necessary for the client computing device (such as via the MCEF application 164) to locally generate a graphical depiction of such identifiers for display to the relevant transportation provider.

In at least some embodiments, the MCEF system may provide each user with a mobile electronic wallet, which stores merchant card data in a recognizable manner to enable users to interact with and obtain value from the stored merchant cards. In this manner, for example, the user may utilize a digital copy of their stored merchant cards (such as via a dedicated application associated with the MCEF system executing on the user's client device) in order to redeem those stored merchant cards. In certain embodiments, individual merchant cards within a user's electronic wallet or a user's entire wallet may be secured (e.g., with one or more alphanumeric passwords, biometric security such as "Touch ID," etc.).

In certain embodiments, merchant cards added to a user's mobile electronic wallet or otherwise associated with that user's MCEF account may be stored locally with respect to the user (such as by a dedicated MCEF application 164 executing on client device 162 of the user) or remotely (such as by one or more databases of storage 130). In certain embodiments, a user may view, download, or interact with merchant cards associated with that user with a login from any device that can access a dedicated MCEF application or the web. In certain embodiments, data representing a particular merchant card may be stored on a remote server associated with the cloud storage system, on the user's client device, or in some other appropriate manner. Merchant card information may be stored by the MCEF system using optical character recognition (OCR) or other visual recognition system. Data fields associated with a merchant card may be populated with whatever data the camera and software can identify. In certain embodiments, the user may be prompted to supply additional information in order to successfully store a merchant card in the MCEF system.

In at least certain embodiments, the MCEF system may authenticate merchant cards added to a user's mobile electronic wallet with a merchant card service provider associated with the merchant card, such as to validate one or more characteristics of the merchant card, verify a card balance associated with the merchant card, etc. For example, as part of registering a new merchant card to a user's electronic wallet, the MCEF system may exchange a series of electronic communications with a computing system associated with an associated merchant card service provider in order to authenticate the merchant card and to validate the identified card characteristics associated with that merchant card. For example, with reference to FIG. 1, the merchant card validation manager 116 may exchange a series of electronic communications with the merchant card service provider 180 via API 184 or GUI 186. In other embodiments, one or more representatives of a MCEF service operating the MCEF system may manually perform various operations to exchange electronic communications with a merchant card service provider in order to authenticate a merchant card and validate any associated card characteristics. By authenticating the merchant card with the merchant card service provider, the MCEF system verifies that any identifiers associated with the merchant card are valid, and may confirm that the identified card characteristics it has associated with the registered merchant card match those card characteristics indicated by the merchant card service provider as associated with those same identifiers.

In at least some embodiments, the MCEF system may enable users to trade or "swap" merchant cards with each other, such as by a user scanning in a photo of their merchant card with their cell phone or other client computing device, providing any additional information needed to use the card, and then adding it to a mobile wallet associated with the user. The user may be prompted to confirm that they want to add the merchant card into the trading network. In certain embodiments, other users may be able to discover the card when searching for a merchant associated with the card. If the value represented by the merchant card is attractive to another user, the other user can offer to purchase the merchant card by exchanging one or more merchant cards stored within the other user's own mobile wallet, cash, or other currency or item of value. The user being issued the offer may be notified of a user trying to trade and the offer may be displayed. From there the users can barter and edit their terms until they come to a commonly respected agreement. When both users confirm that the trade is what they want, the digital card items that are to be exchanged may be removed from the outgoing wallet and added to the recipient's wallet. To provide additional security, in certain embodiments the MCEF system may prompt a user to provide certain collateral information (such as credit card or debit card information, bank account information, PayPal information, and/or personal identification information.

In at least some embodiments, the MCEF system may employ "void-and-reissue" transactions for trading of merchant cards between users. In such transactions, identification information specific to a particular merchant card is changed but the account balance associated with the merchant card is preserved. When a user adds a merchant card into the MCEF system and is confirmed for the open market, the physical merchant card is voided and a digital copy is created with new identification information (e.g., a new barcode). If the user decides to keep the card, the card is pulled down from the open market (it can no longer be discovered by other users) and the card code/barcode becomes visible to the user. Up until that point, the MCEF system retains all information on the card and hides everything from the user except the value and the brand of the card. This way, users can trade freely and never worry about someone spending a card that was traded. Additionally, because the MCEF system may create digital copies of cards, the system may enable users to split up the individual values of their cards. For instance, if a user has a $300 Nordstrom merchant card that they want to trade for a Target merchant card, they would not be required to offer all $300 dollars, but instead any portion of that card that they desire. Additionally, when trading, a user may see that the user offered $50 of Nordstrom for their $70 Target and they do not believe that is a fair amount. In response, the user could initiate an adjustment to terms of the offered exchange by requesting more of the Nordstrom value than was offered.

In certain embodiments, a user of the MCEF system may sell a merchant card stored in the user's mobile wallet for cash or digital currency. For example, a user may exchange a stored merchant card for a cash value equal to or less than the value originally associated with the merchant card. In certain embodiments, the MCEF system may charge a fee for such transactions, such as a flat fee, a percentage of the transaction amount, or other fee. Such cash exchange transaction functionality may enable users to quickly transform a stored merchant card to a "liquid" value that may be utilized at merchants other than the merchant associated with the stored merchant card.

Users of the MCEF application and system may be required to upload a form of identification, as well as one or more forms of payment (debit, credit, PayPal, bank account). If they commit fraud, they may be charged for the amount of fraud they commit as well as the costs to process their fraud. If a user links in a form of payment that cannot be overdrafted, then the MCEF system may send requests for an amount needed to wholly or partially restore funds associated with the fraud, and may repeat this process multiple times over a period of time (e.g., one week).

The MCEF system may enable users to access and spend their cards. When a card is scanned into the system, one or more identifiers of the merchant card (such as a one-dimensional, two-dimensional or three-dimensional barcode, or other electronically readable visual identifier) may be recorded or otherwise stored by the MCEF system. Such identifiers may be displayed on the MCEF application when the card is selected to be "used" or "spent" by the user of the MCEF application.

In certain embodiments, the MCEF system may display one or more advertisements to users of the system or mobile application. Additionally, the MCEF system may determine to feature one or more particular merchants when customers are browsing the market for merchant cards provided by the MCEF system, and/or make recommendations to users in one or more other manners. Such advertisements and/or recommendations may be based on particular merchant cards stored in a user's mobile wallet, where they shop most, and what cards they do and do not use/search for. In an embodiment, the MCEF system may charge one or more fees to merchants in exchange for promotion to users of the MCEF system.

As indicated elsewhere herein, the MCEF system may track user shopping and purchase histories, and in certain embodiments may offer real time recommendations for cards that are available on the market to buy at a discount based on their preferences. In certain embodiments, the MCEF system may determine a user's location based on a location of the user's client device. For example, when the MCEF system determines that the user is within, or within a predefined geographic proximity to, a merchant location, the MCEF system 110 may provide notification to the user regarding particular merchant cards redeemable in that merchant location that are either already stored within the user's mobile electronic wallet, or available for purchase from other users of the MCEF system. In at least some embodiments, a determination that the device associated with the user is within a predefined geographic proximity to a merchant location, and various user interactions with the mobile device and/or a MCEF application 164 executing on that device may be enabled by the MCEF system or application. For example, a user may be able to initiate the display of one or more merchant cards in their electronic wallet by shaking or otherwise gesturing with their mobile device. Similarly, such gestures or other commands may be enabled based on such detected geographic proximity, such as to display cards available for purchase from other users that are associated with the proximate merchant.

In certain embodiments, the MCEF system may enable a user to "cash out" a merchant card by requesting that the MCEF system void all value associated with the merchant card in exchange for a cash value. In this manner, the MCEF system may prevent the user from subsequently utilizing the merchant card, either via the MCEF system or in any other manner. In certain scenarios and embodiments, merchant cards that are not enabled for "cashing out" may still be registered with the MCEF system for use with respect to one or more merchants associated with the merchant card, for trading with other users, etc.

Instantly trading: The MCEF system may collect aggregated data regarding use of particular or multiple merchant cards. In certain embodiments, the MCEF system may utilize such aggregated data to provide merchants and/or users with appraisal of associated merchant cards. For example, if a user does not wish to initiate a barter process but wishes to retain more value than merely cashing out, the user may convert a merchant card into a distinct other merchant card of a different type directly though a digital trading house provided by the MCEF system, which may automatically create a conversion rate based on aggregate supply and demand data associated with the respective merchant cards. That is to say, a card with more turnover would convert into more value of a card with less demand. A card with low demand would convert into less value of a card with more demand, even if both cards are worth the same amount. For example, a merchant card representing $50 at merchant A may be converted to a merchant card representing $40 at merchant B.

Marking and using unwanted cards: If a user has a series of cards that they do not want and/or will not use, the user may, in certain embodiments, mark those cards and next time they are in a store they can notify the MCEF application that they would like those cards to automatically transfer over to the merchant card that is from the store they are in, regardless of the change in value (see "instantly trading" section"). For example, if the user has marked merchant cards respectively associated with $15 at Target and $20 at Starbucks but they are standing in a Walmart and their total is $30 at the register, they can have the MCEF system instantly transfer the Target and Starbucks into Walmart credit (in an amount based on current conversion rates as determined by the MCEF system) and cash out.

Multiple merchant cards associated with a single merchant that are added into an individual user's mobile wallet may be consolidated into a single merchant card representing the combined value of those multiple cards.

Through merchant accounts, merchants can, according to some embodiments, send out promotions to an individual customer or group of customers holding certain retailer's card in their mobile wallet. Such upgrades may be purchased and/or added to the specific gift cards in the user's wallet.

The MCEF system may, in certain embodiments, provide one or more identifiers associated with a merchant card only when a user wants to use that merchant card. In this manner the MCEF system may require less personal data than might otherwise be required to have an account. Also, if a card is added to the open market, taken down (so the card code is visible) and then re-uploaded to the market, the MCEF system may again alter the identification information associated with the particular merchant card. Every time a user sees a code and does not spend the card, the MCEF system may determine to alter the merchant card if it is exchanged in any manner, in order to increase security associated with identification information specific to a particular merchant card.

Again referring to the depicted embodiment of FIG. 1, merchant card service provider 180 includes a Web server 182, an API 184, a GUI 186, merchant card information database 188, and user information database 189. The merchant card service provider may, in certain scenarios, be functionally incorporated within and/or operated by a merchant 190, such as in situations in which the merchant itself issues merchant cards for use by its own customers. Furthermore, in an embodiment, a merchant card service provider may operate the MCEF system itself, either as a sole operator or in conjunction with one or more other entities. The MCEF system may interact with the merchant card service providers 180 in various manners to effectuate various functionality. For example, in various embodiments the MCEF system may exchange a variety of electronic communications (such as via the provided API 184, or via the GUI 186 as provided by Web server 182) with the merchant card service provider, such as to authenticate a merchant card provided to the MCEF system by a client computing device associated with a user of the MCEF system; to validate particular card characteristics associated with such a merchant card; etc. Furthermore, the merchant may, as in the depicted embodiment, utilize one or more merchant card validators 192 to validate a merchant card, such as when the merchant card is presented for use at a location of the merchant.

In situations in which the MCEF system 110 or a merchant card service provider 180 provides one or more Web sites respectively posted by Web servers 118 and 182, at least some users 160 may perform various additional interactions using such Web sites. For example, a user may use a client computing device (such as client computing device 162) to interact with the MCEF system 110 over networks 101, such as to obtain Web pages or other electronic information pages (e.g., HTML-based emails, or other groups of information that are formatted at least in part based on HTML or other formats or markups) from the MCEF system, and to optionally provide various information, as described elsewhere herein. Such users may access a Web site provided by the MCEF system to obtain one or more Web pages, such as to view information about, search for, browse for, and/or provide information related to the user or to merchant cards, and in certain embodiments other information (e.g., user account information, preference information, etc.) is stored by the MCEF system 110. In certain embodiments, the MCEF system may store various types of user information 162 about such online interactions, including, in some cases, to record and store information about all interactions and activities performed by the user with respect to the MCEF system.

In the depicted networked environment 100 of FIG. 1, the network 101 is a publicly accessible network of linked networks, possibly operated by various distinct parties, such as the Internet. In other embodiments, the network 101 may have other forms. For example, the network 101 may instead be a private network, such as a corporate or university network that is wholly or partially inaccessible to non-privileged users. In still other embodiments, the network 101 may include both private and public networks, with one or more of the private networks having access to and/or from one or more of the public networks. Furthermore, the network 101 may include various types of wired and/or wireless networks in various situations. In addition, in this illustrated example of FIG. 1, the users may utilize client computing systems and/or other client devices (not shown) to interact with the MCEF system 110 to obtain various described functionality via the network 101, and in doing so may provide various types of information to the MCEF system 110. Moreover, in certain embodiments, the various users and providers of the networked environment 100 may interact with the MCEF system and/or one or more other users and providers using an optional private or dedicated connection, such as one of dedicated connections 102. For example, dedicated connections 102 may include one or more VPN (Virtual Private Network) connections.

The MCEF system may, in certain embodiments, provide functionality to one or more merchants in order to enable those merchants to offer merchant cards and promotions using the MCEF system and/or application executing on a client device of the user.

In some embodiments, metadata may be collected from users to provide valuable information about specific users and associated buying and spending habits to merchants (at a price). This may allow for marketing plans integrated with the systems and methods described herein to be significantly more specific, efficient and, therefore, cost effective for such merchants.

Merchant accounts: In some embodiments, the MCEF system may charge users per-transaction, or monthly fees or yearly fees may be paid by users to opt out of such individual transaction costs. In certain scenarios, the MCEF system may exempt transaction costs for users or involved retailers based on a volume of merchant card transactions with the MCEF system, such as if such parties "turnover" considerable amounts of cards in a defined period of time.

FIGS. 3A-3F illustrate examples of a graphical user interface provided by a MCEF system as displayed on an exemplary computing device of a user in accordance with at least some techniques described in the present disclosure, such as via a dedicated MCEF application executing on a client device of the user. Such an interface may be provided, for example, on a display of client device 162 and MCEF application 164 of FIG. 1.

Figure 3B:
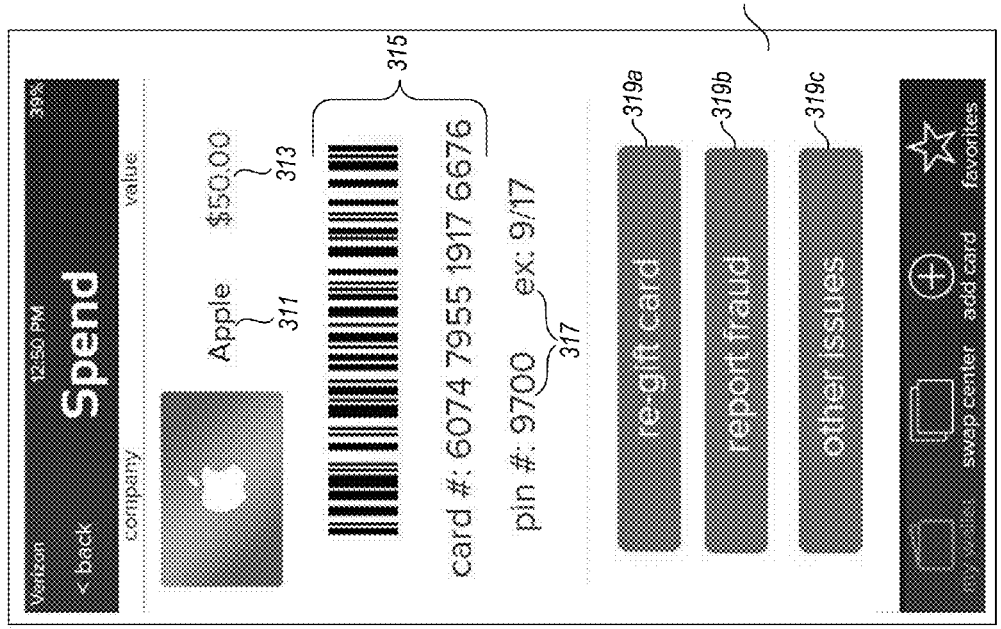
FIGS. 3A-3F illustrate examples of a graphical user interface provided by a MCEF system as displayed on an exemplary computing device of a user in accordance with at least some techniques described in the present disclosure.
Figure 3A:
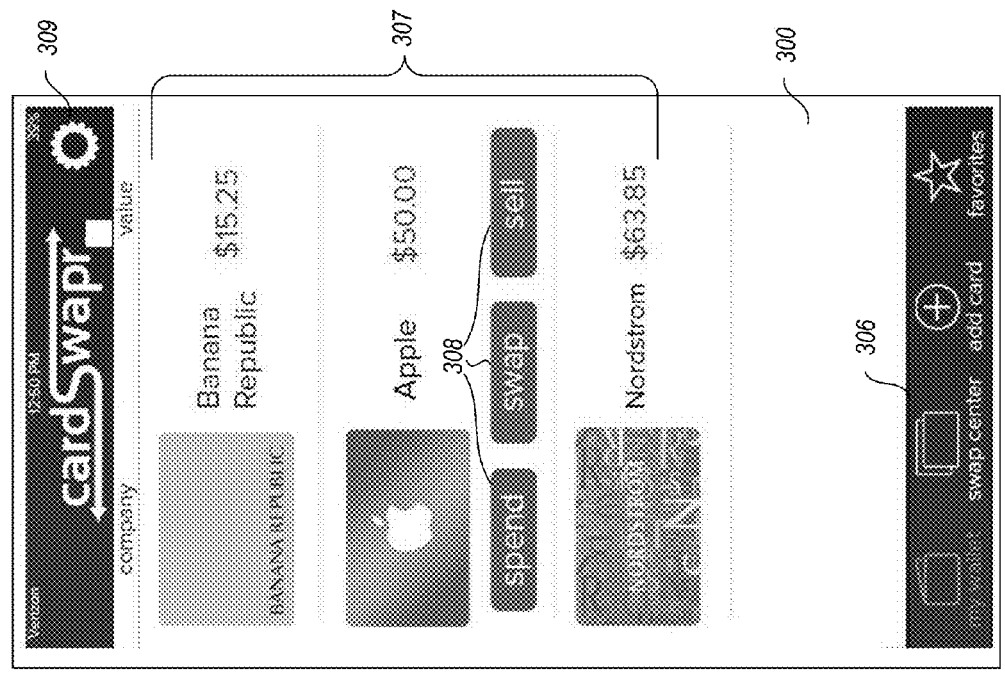

In particular, FIG. 3A depicts a portion of a GUI 300 that depicts an electronic wallet associated with the current user. The GUI 300 includes user tab selection bar 306, various merchant cards and associated card characteristics 307, user-selectable merchant card operation controls 308, and user-selectable settings control 309.

FIG. 3B depicts a portion of a GUI 301 that includes details applicable to one of the merchant cards 307 of FIG. 3A, such as if a user selected such a merchant card from the user's electronic wallet via one or more interactions with GUI 300 of FIG. 3A. The GUI 301 includes a merchant specification 311, indicating a merchant associated with the selected merchant cards; a card balance 313; merchant card identifiers 315; and other card characteristics 317. In addition, the GUI 301 includes user-selectable merchant card control 319a, allowing the user to "re-gift" the merchant card in order to transfer the merchant card to another user of the MCEF system without requiring compensation for such transfer; merchant card control 319b, allowing the user to report one or more fraudulent issues related to the selected merchant card; and merchant card control 319c, allowing the user to report other users related to the selected merchant card.

Figure 3D:
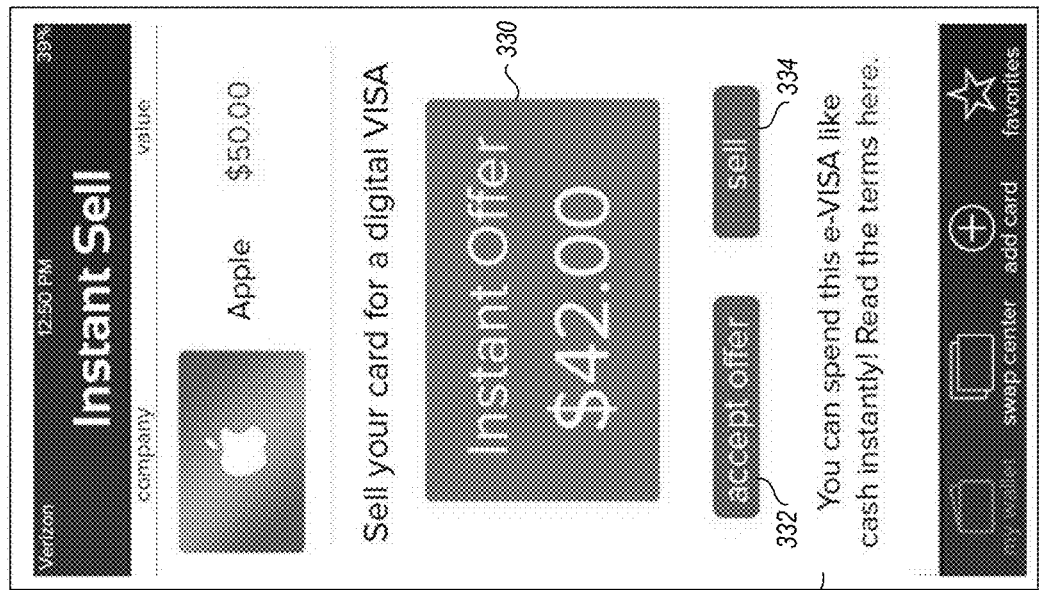
Figure 3C:
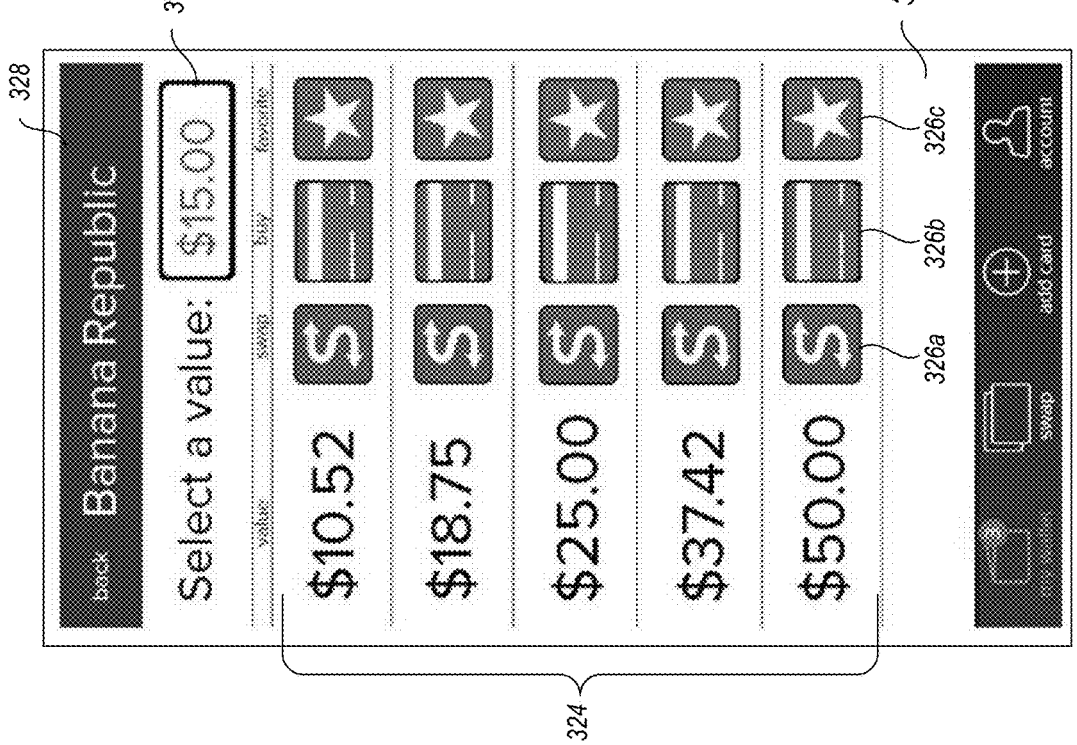

FIG. 3C depicts a portion of a GUI 302 that includes additional details applicable to one of the merchant cards 307 of FIG. 3A, such as if the user selected the "swap" control 308 with respect to the "Banana Republic" card of GUI 300. The GUI 302 includes a currency data field 322 (currently showing "$15.00") and merchant card availability indicators 324, each of which is associated with a set of user-selectable card operation controls 326. The card operation controls 326 include swap control 326a, allowing the user to swap the currency amount within currency data field 322 that is associated with merchant identifier 328 for an equivalent currency amount (as determined by the MCEF system in accordance with its calculated exchange rates) associated with one of the merchant card availability indicators 324; purchase control 326b, allowing the user to purchase the indicated currency amount associated with one of the merchant card availability indicators, such as by charging a financial account associated with the current user; and preferred merchant control 326c, allowing the user to indicate that the merchant associated with the corresponding merchant card availability indicator is a "favorite" of the current user.

FIG. 3D depicts a portion of a GUI 303 that depicts additional details applicable to one of the merchant cards 307 of FIG. 3A, such as if the user selected the "sell" control 308 with respect to the "Apple" card of GUI 300. The GUI 303 includes a user-selectable "instant offer" control 330, and "accept offer" control 332, and a "sell" control 334.

Figure 3F:
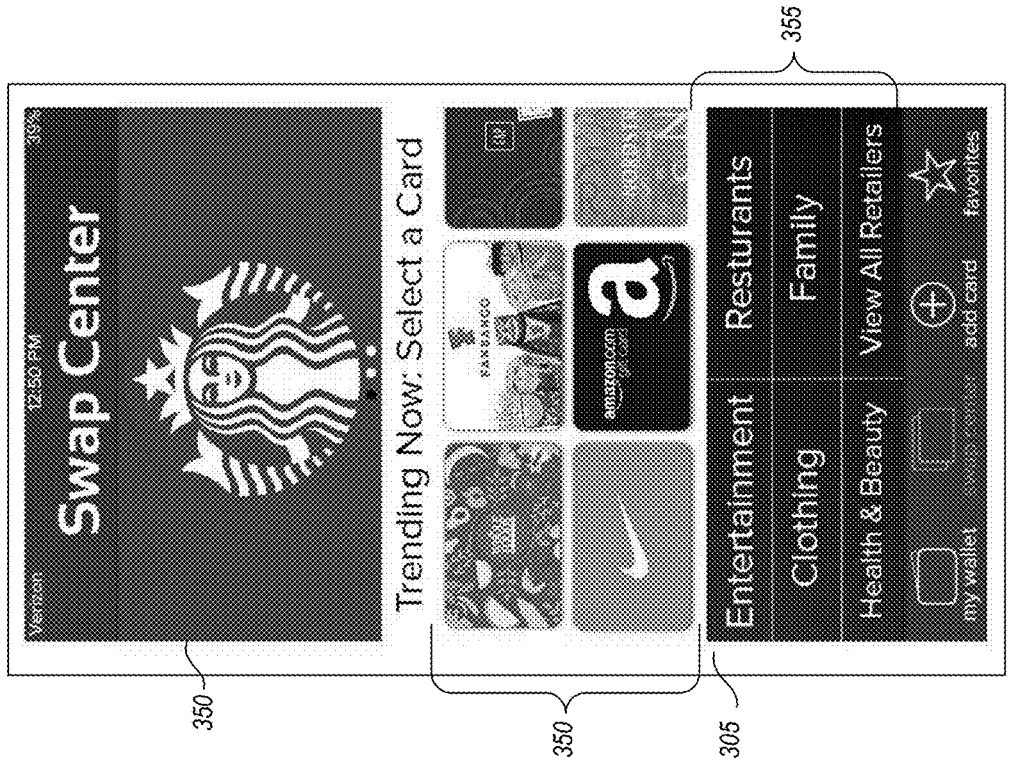
Figure 3E:
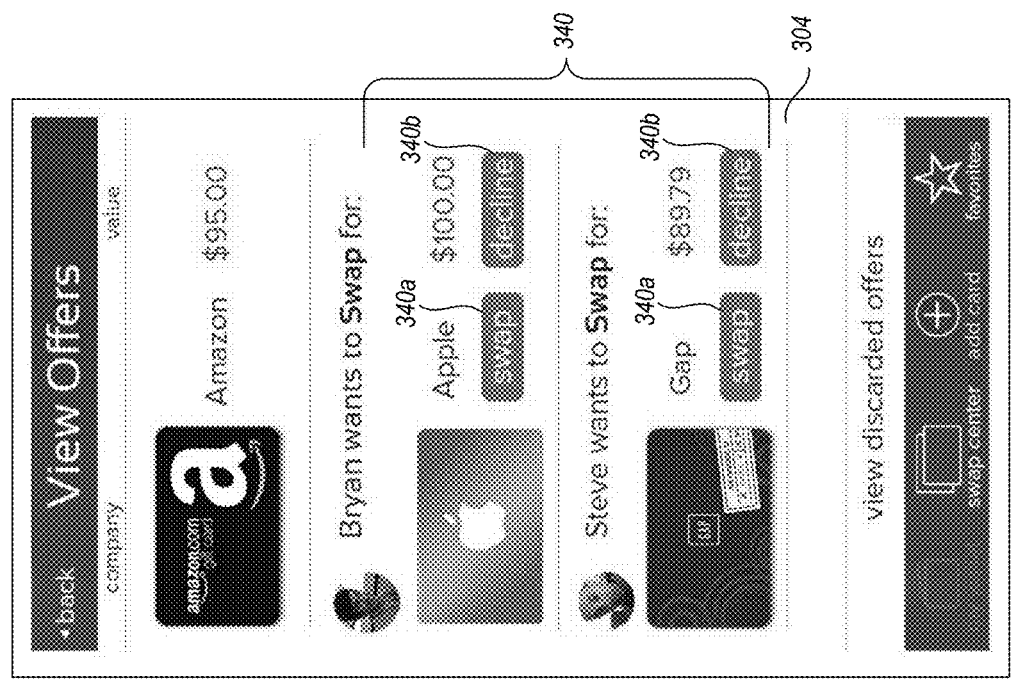

FIG. 3E depicts a portion of a GUI 304 that depicts additional details applicable to one of the merchant cards 307 of FIG. 3A, and in particular displays current offers for particular merchant cards currently associated with the user's electronic wallet. Two offers from other users of the MCEF system are currently displayed (indicating that Bryan wants to swap the $95 indicated balance associated with the current user's "Amazon" merchant card for $100 of a merchant card associated with "Apple," and further indicating that Steve wants to swap the same indicated balance of the current user's "Amazon" merchant card for $89.79 of a merchant card associated with "Gap"). Each offer 340 includes user-selectable trading controls 340a ("swap") and 340b ("decline"), respectively allowing the user to accept or decline the respective offer.

FIG. 3F depicts a portion of a GUI 305 that enables the current user to browse or search for merchant cards within the MCEF system that are available for purchase or trade, such as from other users of the MCEF system, from merchant partners of the MCEF system, or from the MCEF system itself. In particular, the GUI 305 includes featured merchant cards 350, as well as user-selectable category controls 355. In certain embodiments, the GUI 305 may additionally include various other user-selectable controls for performing one or more searches of available merchant cards within the MCEF system (e.g., textual search fields, additional graphical controls, etc.).

Additional details related to the features and functionality provided by one or more graphical user interfaces of the MCEF system and/or MCEF application are described below.

My Wallet

The "My Wallet" page may provide an indication of every active merchant card bought, traded, or added to a user's mobile wallet in the MCEF system. In depicted embodiments, the initial view may be divided into two main columns: company and value. On the left, a user may see the company name for all the cards that user has in his wallet neatly organized in a stack. On the right, a user may see the USD value for each stored merchant card. When a user selects a merchant card in that user's mobile wallet, the user may see the expanded view of options: use card and view offers. Clicking "Use Card" may provide an indication of a simple barcode that may be scanned or otherwise utilized at any merchant associated with the particular merchant card. Clicking on the "View Offers" page may initiate display to a first user regarding any other user that has made an offer on a merchant card associated with the first user.

Browse

The browse page allows a user to search for any merchant card, user, or friend. From there, a user may select a desired merchant card, then buy or make an offer on it.

Example: Find a Merchant Card for a user's wallet in 10 seconds:
1) Open The MCEF application;
2) Click the "Browse" tab;
3) Search the retailer, user, or friend from which the user wants to buy; and
4) Buy (or make an offer) and it is added to the user's wallet! Done!

Making an Offer on Someone's Merchant Cards

When a first user finds a merchant card that user wants that is associated with another user of the MCEF system, the first user may offer to purchase the merchant card for the full price (paying $25 for a $25 merchant card), or, make a lower offer (offering $18 for a $25 merchant card). Such purchases may be completed using cash (through a linked PayPal account); merchant cards from the first user's own mobile wallet ($20 GAP merchant card for a $20 Macy's merchant card); or a combination (Offer $20 GAP merchant card & $10 cash via PayPal for a $35 Nordstrom Card).

Add Card

Another aspect of using The MCEF system is adding a merchant card to a user's wallet.

Example: Add a merchant card to a user's mobile wallet in 10 seconds:
1) Open The MCEF application;
2) Click the "Add Card" tab;
3) Take a picture of the merchant card by clicking the camera button and add in retailer and any other needed information; and
4) When the balance is verified, click "Add to Wallet". Done!

After following the steps above, a user may see a screen that confirms the merchant card's information and balance. The MCEF system may enable the user to exchange that merchant card using interfaces corresponding to Instant Sell and Open to Trades.

Instant Sell

This feature may enable a user to quickly sell an available merchant card by adding a price that buyers see when they view the merchant card. For example, a user may indicate that a merchant card is available via instant sell and optionally add a price (Ex: $50 Gap merchant card; Instant Sell Price: $45).

Open to Trades

A user may make a merchant card available "on the market". The MCEF system may display an indication of the specified merchant card in relevant search results and/or on a publicly visible profile of the user associated with the merchant card. The MCEF system may additionally enable a user to indicate whether that user is willing to accept multiple merchant cards, or cash and card mixes for the available merchant card.

My Profile

In at least certain depicted embodiments the My Profile page of the MCEF system interface may display some or all of a user's account information (e.g., Account usernames and passwords; PayPal information; and user stats such as seller rating, wallet amount, total trades, cards purchased, etc.).

Exemplary Merchant Card Exchange Process
1) Find a card
2) Place Offer (Check both card values and record them) If cards are not the same balance as when last updated, alert user and cancel offer. Otherwise:
3) Accept Offer (Check balances again, since time may pass between offer and acceptance)
  if balance are not equal to offer, cancel and alert users
4) Cards are traded Example of a Fraud Protection Process:
Nightly Check (for 100 Days, Both Cards)
If someone other than the person who now owns the card uses the card (i.e., the other trader), OR IF THE CARD IS NOT USED USING THE 'USE CARD' screen.
If this happens:
UNDO SWAP:
  Return the person's original merchant card.
    Charge the guilty party the DIFFERENCE from the original transaction and give that in the form of an e-VISA
    Guilty party is charged a $10 fee and banned from the system for 90 days. Guilty party still has access to his wallet, but not trades.

Exemplary Balance Checking Criteria:
Add a card initially
Make an offer on another card
When someone makes an offer on a card, checks and records both balances (cancels if balances are not the same as before swap)
Nightly—to update our trade database
When someone accepts an offer on their card
After Trade
(Keep in mind a credit, debit, bank account, or PayPal is linked)
Nightly
When someone tries to use the card
   if fraud (card is spent after)
      charge guilty party $10 fee
      undo swap
   if original person's card is spent; refund in cash from
      guilty party's account.
2 strike per verified account (maybe one)

If a user has more than a predefined quantity of offers related to a single card, the MCEF system may determine to remove that card from the trading market until the user has considered and/or indicated removal of the offers such that there are less than that predefined quantity.

The MCEF system may enable businesses to directly market and access customers via the MCEF system application, including allowing target markets to be selected based on different demographics, interests, etc. Individual users may develop particular interests, which may be developed according to data regarding such users' physical location, stores the user is in, merchant cards used, merchant cards purchased, shopping history, amount of money spent, what cards remain in their MCEF system wallet vs. card that are discarded, and social media responses ("likes," etc.). The MCEF system may protect the identities of individual users, while allowing entity partners to access such users by identifying a "node" of interest (e.g., backpacking, high-end shopping, organic foods, etc.) to which they would like to market. Information provided to such entity partners may include, for example, how many users within a selected geographic radius fit the selected node(s) of interest. Such users may be displayed as individual data points with respect to one or more nodes selected by such partners; such display may reflect individual tendencies—i.e., the more closely an individual user fits the node, the more likely the user is to respond to a piece of direct marketing sent to them.

Entity partners may distribute a series of direct marketing materials. For example, coupons can be sent to individual users that may sit in their MCEF system mobile wallet as would a card. These coupons, by the discretion of the receiving user, can be traded to other users for anything else in a user's MCEF system mobile wallet. Coupons may also be attached to merchant cards remaining in a user's MCEF system wallet. Because every merchant card has a unique card code, a promotion may be linked to that individual card in a user's MCEF system wallet. Depending on the decision of the company sending a promotion, coupons may be aggregated as they are traded (e.g., a $1 off coupon may turn into $2 off coupon if a user receives or trades for a second of the same coupon). The MCEF system may enable entity partners to limit how much a user may aggregate coupons (e.g., coupons can only be combined up to $5 off).

In certain embodiments, such partners may distribute merchant cards to users' MCEF system wallets, and may also send notifications to users to notify them that there is a promotion, sale, opportunity, etc. that they user is likely to be interested in, based on their nodes of interest.

Any time a merchant card comes into the MCEF system, the MCEF system can notify the respective company that we know who has one of their cards, its balance, and based on that person's information (geo-locations, interests, etc.) how likely they are to use the card. Because merchant cards are a liability for companies (unearned revenue) companies can pay the MCEF system to promote to that user to trade the card to a user who is more likely to want to use the card, and spend it sooner, thus reducing liabilities and increasing return customers.

If a user walks by/into a store, the store can set up automatic notifications or reach out actively to inform that customer that there are certain promotions available.

The MCEF system may enable partners to distribute digital merchant cards/promotions and coupons to relevant customers through a distributed MCEF system business module.

If a promotion of any sort is distributed, the distributing company can put an expiration date on that promotion to allow their liabilities to expire.

Using the MCEF system business module, companies can attach reminders based on physical location, time or any other parameter to any promotion to make sure the user uses it.

The MCEF system may enable communication between businesses and customers in both directions.

Users of the MCEF system may actively like/follow certain companies' profiles on the MCEF system application to let the business know that they would like that company to reach out to them and/or interact with them.

The MCEF system may enable users to comment and talk with companies via the MCEF system application to have open and consistent dialogue.

In certain embodiments, the MCEF system may include or interface with a point-of-sale (POS) or other module that may recognize when a nearby user has the MCEF system pulled up and enable them to pay for their purchases via a wireless communication between the user's device and the POS module.

The POS module or other component of the MCEF system may notify the user's device of the exact total of the purchase and then the MCEF system application may immediately purchase the highest discounted card for the closest value to the cost of the transaction for the user, thus saving them money, time and effort.

The MCEF PR module may pull notifications from Facebook, Twitter, blogs, directly from the MCEF system, etc.

Through the PR module, refunds may be distributed, customers may be called or direct messaged, and any transaction can be resolved.

The MCEF system business platform may track significant data for MCEF system customers In certain embodiments, the MCEF system business platform may track and report information such as ROI, number of lead, cost per lead, revenue per lead, conversation rate, click through rate, number of impressions, location/user-specific information, how leads are generated, where they are, what campaigns are the most effective in their space that may be imitated, what campaigns the company has run were the most effective/least effective.

Storage and Usage of Membership Cards

In certain embodiments, the MCEF system may enable partners to distribute membership cards though the MCEF system (e.g., Costco).

Digital membership cards may be stored in the cloud and accessible via authenticated login on any device. NFC may transfer to the logged in device.

Figure 2:
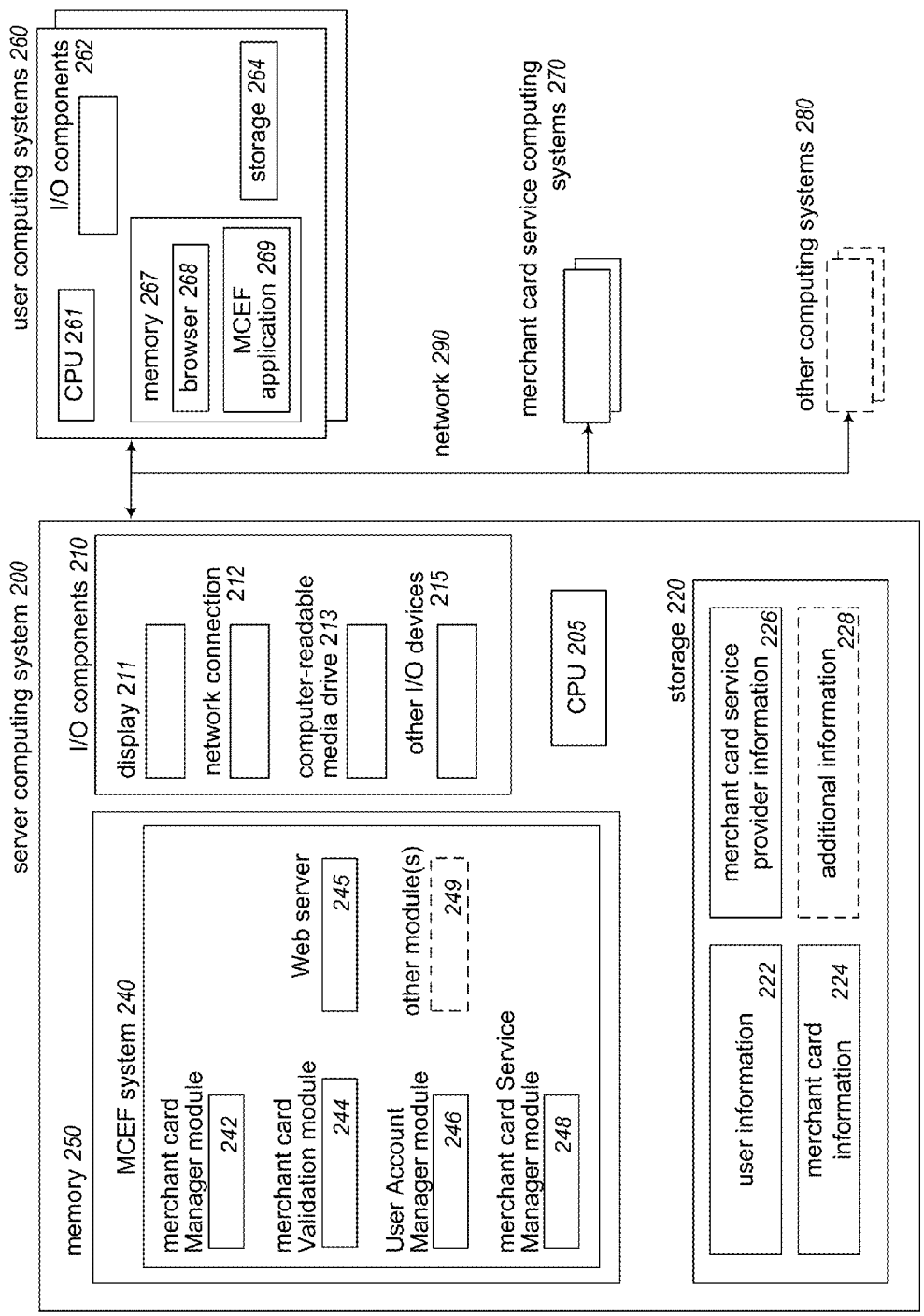
FIG. 2 is a block diagram illustrating component-level functionality provided by a plurality of electronic circuits that, when in combined operation, are suitable for performing and configured to perform at least some of the techniques described in the present disclosure.

FIG. 2 is a block diagram illustrating component-level functionality provided by a plurality of electronic circuits that, when in combined operation, are suitable for performing and configured to perform at least some of the techniques described herein. In the particular embodiment depicted, the plurality of electronic circuits is at least partially housed within a server computing system 200 executing an embodiment of a MCEF system. The server computing system 200 includes one or more central processing units ("CPU") or other processors 205, various input/output ("I/O") components 210, storage 220, and memory 250, with the illustrated I/O components including a display 211, a network connection 212, a computer-readable media drive 213, and other I/O devices 215 (e.g., keyboards, mice or other pointing devices, microphones, speakers, GPS receivers, etc.). The server computing system 200 and MCEF system 240 may communicate with other computing systems via one or more networks 290 (e.g., the Internet, one or more cellular telephone networks, etc.), such as user computing systems 260, merchant card service computing systems 270, and other computing systems 280. Some or all of the other computing systems may similarly include some or all of the types of components illustrated for server computing system 200 (e.g., a MCEF system client application 269 and/or web browser 268 executing in memory 267 of a member user computing system 260 in a manner analogous to MCEF system 240 in memory 250). In addition, the illustrated user computing systems 260, merchant card service computing systems 270 and other computing systems 280 may each have components similar to those of server computing system 200, including (with respect to user computing systems 260) one or more CPUs 261, I/O components 262, and storage 264.

In the illustrated embodiment, an embodiment of the MCEF system 240 executes in memory 250 in order to perform at least some of the described techniques, such as by using the processor(s) 205 to execute software instructions of the system 240 in a manner that configures the processor(s) 205 and computing system 200 to perform automated operations that implement those described techniques. As part of such automated operations, the MCEF system 240, merchant card manager module 242, merchant card validation module 244, user account manager module 246, merchant card service manager module 248, Web server 245 and/or other optional programs or modules 249 executing in memory 250 may store and/or retrieve various types of data, including in the example database data structures of storage 220. In this example, the data used may include various types of user information in database ("DB") 222, various types of merchant card information in DB 224, various types of merchant card service provider information in DB 226, and various types of additional information in DB 228, such as various fee-based or financial information related to one or more users or service providers associated with the MCEF system.

It will be appreciated that computing system 200 and systems 260 and 270 are merely illustrative and are not intended to limit the scope of the present invention. The systems and/or devices may instead each include multiple interacting computing systems or devices, and may be connected to other devices that are not specifically illustrated, including through one or more networks such as the Internet, via the Web, or via private networks (e.g., mobile communication networks, etc.). More generally, a device or other computing system may comprise any combination of hardware that may interact and perform the described types of functionality, optionally when programmed or otherwise configured with particular software instructions and/or data structures, including without limitation desktop or other computers (e.g., tablets, slates, etc.), database servers, network storage devices and other network devices, smart phones and other cell phones, consumer electronics, wearable and other fitness tracking devices, biometric monitoring devices, digital music player devices, handheld gaming devices, PDAs, wireless phones, pagers, electronic organizers, Internet appliances, television-based systems (e.g., using set-top boxes and/or personal/digital video recorders), and various other consumer products that include appropriate communication capabilities. In addition, the functionality provided by the illustrated MCEF system 240 may, in some embodiments, be distributed in various modules. Similarly, in some embodiments, some of the functionality of the MCEF system 240 may not be provided and/or other additional functionality may be available.

It will also be appreciated that, while various items are illustrated as being stored in memory or on storage while being used, these items or portions of them may be transferred between memory and other storage devices for purposes of memory management and data integrity. Alternatively, in other embodiments some or all of the software modules and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., the MCEF system 240 and/or MCEF client software executing on devices 260 and/or 270) and/or data structures, such as by execution of software instructions of the one or more software programs and/or by storage of such software instructions and/or data structures. Furthermore, in some embodiments, some or all of the systems and/or modules may be implemented or provided in other manners, such as by consisting of one or more means that are implemented at least partially in firmware and/or hardware (e.g., rather than as a means implemented in whole or in part by software instructions that configure a particular CPU or other processor), including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a non-transitory computer-readable storage mediums, such as a hard disk or flash drive or other non-volatile storage device, volatile or non-volatile memory (e.g., RAM or flash RAM), a network storage device, or a portable media article (e.g., a DVD disk, a CD disk, an optical disk, a flash memory device, etc.) to be read by an appropriate drive or via an appropriate connection. The systems, modules and data structures may also in some embodiments be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

According to one embodiment, a merchant card exchange facilitator system may be summarized as including one or more processors and at least one memory, the memory including instructions that, upon execution by at least one of the one or more processors, cause the system to: receive one or more first electronic communications sent via one or more computer networks by a client computing device of a first user, wherein the received communications indicate a merchant card and card characteristics associated with the merchant card that include one or more card identifiers and a card balance, and wherein the card balance represents an amount of currency that is usable to purchase one or more products or services from a first merchant associated with the indicated merchant card; validate, via one or more second electronic communications sent over the one or more computer networks, at least some of the indicated card characteristics, the validation of the at least some indicated card characteristics including verification of the card balance of the indicated merchant card; based at least in part on the indicated card characteristics and on the validating, store card information for the indicated merchant card in association with the first user; receive, via one or more third electronic communications sent over the one or more computer networks, a request from a second user to purchase the indicated merchant card from the first user, the request including an offer amount; transmit, via one or more fourth electronic communications sent over the one or more computer networks and based at least in part on the request from the second user, an offer to purchase the indicated merchant card from the first user; receive, via one or more fifth electronic communications sent over the one or more computer networks, an indication that the first user has authorized transfer of the indicated merchant card to the second user; and based at least in part on the indicated authorization from the first user, display one or more indications on a client computing device of the second user that the indicated merchant card has been transferred to the second user, and associate with the second user stored card information for the indicated merchant card, wherein the stored card information includes the verified card balance.

The instructions may further cause the system to determine, based on one or more of an aggregated demand for merchant cards associated with the first merchant and an aggregated supply of merchant cards associated with the first merchant, an exchange rate for card balances of merchant cards associated with the first merchant.

The request from the second user to purchase the indicated merchant card from the first user may be based at least in part on the determined exchange rate for the associated first merchant.

According to one embodiment, a computer-implemented method may be summarized as receiving, by one or more computing systems configured to provide a merchant card exchange facilitator system, one or more first electronic communications sent via one or more computer networks by a client computing device of a first user, the received communications indicating a merchant card and card characteristics associated with the merchant card that include one or more card identifiers and a card balance, the card balance representing an amount of currency that is usable for making purchases from a specified merchant associated with the indicated merchant card; based at least in part on the indicated card characteristics, storing, by the one or more configured computing systems, card information for the indicated merchant card in association with the first user; receiving, by the one or more configured computing systems and via one or more second electronic communications sent over the one or more computer networks, an offer from a second user to purchase the indicated merchant card from the first user; receiving, by the one or more configured computing systems via one or more third electronic communications sent over the one or more computer networks and based at least in part on the offer from the second user, an indication that the first user has authorized transfer of the indicated merchant card; and based at least in part on the indication from the first user, associating, by the one or more configured computing systems, the stored card information for the indicated merchant card with the second user, the stored card information including the card balance.

Storing the card information for the indicated merchant card may include storing data representative of the indicated merchant card within an electronic wallet of the first user that is maintained for the first user by the merchant card exchange facilitator system, and wherein associating the stored card information for the indicated merchant card with the second user may include transferring the data representative of the indicated merchant card from the electronic wallet of the first user to an electronic wallet of the second user that is maintained for the second user by the merchant card exchange facilitator system.

The computer-implemented method may further include, after the associating of the stored card information for the indicated merchant card with the second user, displaying at least one of the one or more associated card identifiers on a mobile device of the second user for use in purchasing one or more products or services from the specified merchant.

The computer-implemented method may further include validating at least some of the indicated card characteristics via one or more additional electronic communications transmitted over the one or more computer networks between the one or more configured computing systems and a communications interface associated with the specified merchant, the validating of the at least some indicated card characteristics including verifying the card balance associated with the indicated merchant card.

The first user and second user may be part of a plurality of users of the merchant card exchange facilitator system, the specified merchant may be one of a plurality of merchants respectively associated with a plurality of merchant cards that are respectively associated with the plurality of users, and the method may further include determining, based on one or more of an aggregated demand for merchant cards associated with the specified merchant and an aggregated supply of merchant cards associated with the specified merchant, an exchange rate associated with the specified merchant. The computer-implemented method may further include, after the associating of the stored card information for the indicated merchant card with the second user, receiving a request from the second user to sell the indicated merchant card and, based at least in part on receiving the request, providing a monetary payment to the second user in an amount based on the card balance and on the determined exchange rate for the associated specified merchant, the provided payment including one or more of a monetary payment and a card balance associated with a second merchant other than the specified merchant. The offer from the second user to purchase the indicated merchant card from the first user may be based at least in part on the determined exchange rate for the associated specified merchant.

The computer-implemented method may further include, after the associating of the stored card information for the indicated merchant card with the second user, receiving an indication that a mobile device of the second user is within a predefined geographic proximity to a location associated with the specified merchant. The computer-implemented method may further include, based at least in part on the indication of geographic proximity and on the associating of the stored card information for the indicated merchant card with the second user, displaying promotional content associated with the specified merchant on the mobile device of the second user. The computer-implemented method may further include, based at least in part on the indication of geographic proximity and on the associating of the stored card information for the indicated merchant card with the second user, automatically displaying information related to the indicated merchant card on the mobile device of the second user.

Receiving the offer from the second user to purchase the indicated merchant card from the first user may be based at least in part on search results provided by the merchant card exchange facilitator system in response to one or more criteria received from a client computing device of the second user.

According to one embodiment, a non-transitory computer-readable medium may be summarized as including stored contents that, when executed, configure one or more computing systems of a merchant card exchange facilitator system to: receive, by the one or more configured computing systems, one or more first electronic communications sent via one or more computer networks by a client computing device of a first user, the received communications being indicative of a merchant card and card characteristics associated with the merchant card that include one or more card identifiers and a card balance, the card balance representing an amount of currency that is usable for making purchases from a specified merchant; based at least in part on the indicated card characteristics, storing, by the one or more configured computing systems, card information representative of the indicated merchant card in association with an electronic wallet of the first user; receiving, by the one or more configured computing systems and via one or more second electronic communications sent over the one or more computer networks, an offer from a second user to purchase the indicated merchant card from the first user; receiving, by the one or more configured computing systems via one or more third electronic communications sent over the one or more computer networks and based at least in part on the offer from the second user, an indication that the first user has authorized transfer of the indicated merchant card; and based at least in part on the indication from the first user, associating, by the one or more configured computing systems, the stored card information for the indicated merchant card with an electronic wallet of the second user.

The stored contents may further configure the one or more computing systems to validate at least some of the indicated card characteristics via one or more additional electronic communications with a communications interface associated with the specified merchant, the validation of the at least some indicated card characteristics including verifying the card balance associated with the indicated merchant card.

The stored contents may further configure the one or more computing systems to determine, based on one or more of an aggregated demand for merchant cards associated with the specified merchant and an aggregated supply of merchant cards associated with the specified merchant, an exchange rate for card balances of merchant cards associated with the specified merchant.

The stored contents may further configure the one or more computing systems to, after the associating of the stored card information for the indicated merchant card with the second user, receive a request from the second user to sell the indicated merchant card and, based at least in part on receiving the request, provide a payment to the second user in an amount based on the card balance and on the determined exchange rate for the associated specified merchant. The provided payment may include one or more of a monetary payment and a card balance associated with a second merchant distinct from the specified merchant.

The stored contents may further configure the one or more computing systems to, based at least in part on the association of the indicated merchant card with the electronic wallet of the second user and on an indication from a mobile device of the second user that the mobile device is within a predefined geographic proximity of a location associated with the specified merchant, display promotional content associated with the specified merchant on the mobile device of the second user.

Receiving the offer from the second user to purchase the indicated merchant card from the first user may be based at least in part on search results provided by the merchant card exchange facilitator system in response to one or more criteria specified by the second user.

Certain specific details are set forth herein in order to provide a thorough understanding of various disclosed techniques and embodiments of such techniques. However, one skilled in the relevant art will recognize that various embodiments may be practiced without one or more of these specific details, or with other methods, components, etc.

Unless the context requires otherwise, throughout the specification and claims, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the embodiments.

What is claimed is:

1. A merchant card exchange facilitator system, comprising:
   one or more processors; and
   at least one memory, the memory including instructions that, upon execution by at least one of the one or more processors, cause the system to:
      receive one or more first electronic communications sent via one or more computer networks by a client computing device of a first user, wherein the received communications indicate a merchant card and card characteristics associated with the merchant card that include one or more card identifiers and a card balance, and wherein the card balance represents an amount of currency that is usable to purchase one or more products or services from a first merchant associated with the indicated merchant card;

validate, via one or more second electronic communications sent over the one or more computer networks, at least some of the indicated card characteristics, the validation of the at least some indicated card characteristics including verification of the card balance of the indicated merchant card;

based at least in part on the indicated card characteristics and on the validating, store card information for the indicated merchant card in association with the first user;

receive, via one or more third electronic communications sent over the one or more computer networks, a request from a second user to purchase the indicated merchant card from the first user, the request including an offer amount;

transmit, via one or more fourth electronic communications sent over the one or more computer networks and based at least in part on the request from the second user, an offer to purchase the indicated merchant card from the first user;

receive, via one or more fifth electronic communications sent over the one or more computer networks, an indication that the first user has authorized transfer of the indicated merchant card to the second user; and based at least in part on the indicated authorization from the first user,
 display one or more indications on a client computing device of the second user that the indicated merchant card has been transferred to the second user, and
 associate with the second user stored card information for the indicated merchant card, wherein the stored card information includes the verified card balance.

2. The system of claim 1 wherein the instructions further cause the system to determine, based on one or more of an aggregated demand for merchant cards associated with the first merchant and an aggregated supply of merchant cards associated with the first merchant, an exchange rate for card balances of merchant cards associated with the first merchant.

3. The system of claim 2 wherein the request from the second user to purchase the indicated merchant card from the first user is based at least in part on the determined exchange rate for the associated first merchant.

4. A computer-implemented method, comprising:
 receiving, by one or more computing systems configured to provide a merchant card exchange facilitator system, one or more first electronic communications sent via one or more computer networks by a client computing device of a first user, the received communications indicating a merchant card and card characteristics associated with the merchant card that include one or more card identifiers and a card balance, the card balance representing an amount of currency that is usable for making purchases from a specified merchant associated with the indicated merchant card;
 based at least in part on the indicated card characteristics, storing, by the one or more configured computing systems, card information for the indicated merchant card in association with the first user;
 receiving, by the one or more configured computing systems and via one or more second electronic communications sent over the one or more computer networks, an offer from a second user to purchase the indicated merchant card from the first user;
 receiving, by the one or more configured computing systems via one or more third electronic communications sent over the one or more computer networks and based at least in part on the offer from the second user, an indication that the first user has authorized transfer of the indicated merchant card; and
 based at least in part on the indication from the first user, associating, by the one or more configured computing systems, the stored card information for the indicated merchant card with the second user, the stored card information including the card balance.

5. The computer-implemented method of claim 4 wherein storing the card information for the indicated merchant card includes storing data representative of the indicated merchant card within an electronic wallet of the first user that is maintained for the first user by the merchant card exchange facilitator system, and wherein associating the stored card information for the indicated merchant card with the second user includes transferring the data representative of the indicated merchant card from the electronic wallet of the first user to an electronic wallet of the second user that is maintained for the second user by the merchant card exchange facilitator system.

6. The computer-implemented method of claim 4 further comprising, after the associating of the stored card information for the indicated merchant card with the second user, displaying at least one of the one or more associated card identifiers on a mobile device of the second user for use in purchasing one or more products or services from the specified merchant.

7. The computer-implemented method of claim 4, further comprising validating at least some of the indicated card characteristics via one or more additional electronic communications transmitted over the one or more computer networks between the one or more configured computing systems and a communications interface associated with the specified merchant, the validating of the at least some indicated card characteristics including verifying the card balance associated with the indicated merchant card.

8. The computer-implemented method of claim 4 wherein the first user and second user are part of a plurality of users of the merchant card exchange facilitator system, wherein the specified merchant is one of a plurality of merchants respectively associated with a plurality of merchant cards that are respectively associated with the plurality of users, and wherein the method further comprises determining, based on one or more of an aggregated demand for merchant cards associated with the specified merchant and an aggregated supply of merchant cards associated with the specified merchant, an exchange rate associated with the specified merchant.

9. The computer-implemented method of claim 8 further comprising, after the associating of the stored card information for the indicated merchant card with the second user, receiving a request from the second user to sell the indicated merchant card and, based at least in part on receiving the request, providing a monetary payment to the second user in an amount based on the card balance and on the determined exchange rate for the associated specified merchant, the provided payment including one or more of a monetary payment and a card balance associated with a second merchant other than the specified merchant.

10. The computer-implemented method of claim 8 wherein the offer from the second user to purchase the indicated merchant card from the first user is based at least in part on the determined exchange rate for the associated specified merchant.

11. The computer-implemented method of claim 4 further comprising, after the associating of the stored card information for the indicated merchant card with the second user, receiving an indication that a mobile device of the second user is within a predefined geographic proximity to a location associated with the specified merchant.

12. The computer-implemented method of claim 11 further comprising, based at least in part on the indication of geographic proximity and on the associating of the stored card information for the indicated merchant card with the second user, displaying promotional content associated with the specified merchant on the mobile device of the second user.

13. The computer-implemented method of claim 11 further comprising, based at least in part on the indication of geographic proximity and on the associating of the stored card information for the indicated merchant card with the second user, automatically displaying information related to the indicated merchant card on the mobile device of the second user.

14. The computer-implemented method of claim 4 wherein receiving the offer from the second user to purchase the indicated merchant card from the first user is based at least in part on search results provided by the merchant card exchange facilitator system in response to one or more criteria received from a client computing device of the second user.

15. A non-transitory computer-readable medium having stored contents that, when executed, configure one or more computing systems of a merchant card exchange facilitator system to:
   receive, by the one or more configured computing systems, one or more first electronic communications sent via one or more computer networks by a client computing device of a first user, the received communications being indicative of a merchant card and card characteristics associated with the merchant card that include one or more card identifiers and a card balance, the card balance representing an amount of currency that is usable for making purchases from a specified merchant;
   based at least in part on the indicated card characteristics, storing, by the one or more configured computing systems, card information representative of the indicated merchant card in association with an electronic wallet of the first user;
   receiving, by the one or more configured computing systems and via one or more second electronic communications sent over the one or more computer networks, an offer from a second user to purchase the indicated merchant card from the first user;
   receiving, by the one or more configured computing systems via one or more third electronic communications sent over the one or more computer networks and based at least in part on the offer from the second user, an indication that the first user has authorized transfer of the indicated merchant card; and
   based at least in part on the indication from the first user, associating, by the one or more configured computing systems, the stored card information for the indicated merchant card with an electronic wallet of the second user.

16. The non-transitory computer-readable medium of claim 15 wherein the stored contents further configure the one or more computing systems to validate at least some of the indicated card characteristics via one or more additional electronic communications with a communications interface associated with the specified merchant, the validation of the at least some indicated card characteristics including verifying the card balance associated with the indicated merchant card.

17. The non-transitory computer-readable medium of claim 15 wherein the stored contents further configure the one or more computing systems to determine, based on one or more of an aggregated demand for merchant cards associated with the specified merchant and an aggregated supply of merchant cards associated with the specified merchant, an exchange rate for card balances of merchant cards associated with the specified merchant.

18. The non-transitory computer-readable medium of claim 15 wherein the stored contents further configure the one or more computing systems to, after the associating of the stored card information for the indicated merchant card with the second user, receive a request from the second user to sell the indicated merchant card and, based at least in part on receiving the request, provide a payment to the second user in an amount based on the card balance and on the determined exchange rate for the associated specified merchant, the provided payment comprising one or more of a monetary payment and a card balance associated with a second merchant distinct from the specified merchant.

19. The non-transitory computer-readable medium of claim 15 wherein the stored contents further configure the one or more computing systems to, based at least in part on the association of the indicated merchant card with the electronic wallet of the second user and on an indication from a mobile device of the second user that the mobile device is within a predefined geographic proximity of a location associated with the specified merchant, display promotional content associated with the specified merchant on the mobile device of the second user.

20. The non-transitory computer-readable medium of claim 15 wherein receiving the offer from the second user to purchase the indicated merchant card from the first user is based at least in part on search results provided by the merchant card exchange facilitator system in response to one or more criteria specified by the second user.

* * * * *